United States Patent
Shimodoi

(10) Patent No.: US 10,102,088 B2
(45) Date of Patent: Oct. 16, 2018

(54) CLUSTER SYSTEM, SERVER DEVICE, CLUSTER SYSTEM MANAGEMENT METHOD, AND COMPUTER-READABLE RECORDING MEDIUM

(71) Applicant: NEC Solution Innovators, Ltd., Tokyo (JP)

(72) Inventor: Katsushi Shimodoi, Tokyo (JP)

(73) Assignee: NEC Solution Innovators, Ltd., Tokyo (JP)

(*) Notice: Subject to any disclaimer, the term of this patent is extended or adjusted under 35 U.S.C. 154(b) by 118 days.

(21) Appl. No.: 15/107,066

(22) PCT Filed: Dec. 15, 2014

(86) PCT No.: PCT/JP2014/083085
§ 371 (c)(1),
(2) Date: Jun. 21, 2016

(87) PCT Pub. No.: WO2015/098589
PCT Pub. Date: Jul. 2, 2015

(65) Prior Publication Data
US 2017/0039118 A1  Feb. 9, 2017

(30) Foreign Application Priority Data
Dec. 25, 2013  (JP) ................ 2013-267038

(51) Int. Cl.
*G06F 11/20* (2006.01)
*H04L 12/26* (2006.01)
*G06F 11/07* (2006.01)

(52) U.S. Cl.
CPC ...... *G06F 11/2033* (2013.01); *G06F 11/0709* (2013.01); *G06F 11/0757* (2013.01);
(Continued)

(58) Field of Classification Search
CPC .. G06F 11/20; G06F 11/2033; G06F 11/0709; G06F 11/0757
(Continued)

(56) References Cited

U.S. PATENT DOCUMENTS

| | | | |
|---|---|---|---|
| 6,785,840 B1* | 8/2004 | Smith ................ | G06F 11/2007 710/305 |
| 7,590,737 B1* | 9/2009 | Chen .................... | G06F 11/004 709/223 |

(Continued)

FOREIGN PATENT DOCUMENTS

| | | |
|---|---|---|
| CN | 1483163 A | 3/2004 |
| CN | 101291243 A | 10/2008 |

(Continued)

OTHER PUBLICATIONS

Hayami Akiyama, et al., VMware Tettei Nyumon, 1st edition, Shoeisha Co., Ltd., Nov. 12, 2008 (Nov. 12, 2008), pp. 280 to 283, (5 pages).

(Continued)

*Primary Examiner* — Kamini B Patel
(74) *Attorney, Agent, or Firm* — Wilmer Cutler Pickering Hale and Dorr LLP

(57) ABSTRACT

A cluster system includes server apparatuses (10,20) connected by communication paths. Each server apparatus includes: a signal transmission unit (11) that transmits a signal indicating a self-presence to the other server apparatus via the communication paths (30-50); a reliability determination unit (12) that determines whether the communication paths (30-50) are reliable; and a processing management unit (13) that, in a state where the signal is not receivable from the other server apparatus, checks whether the communication paths to the other server apparatus have been determined to be reliable, and stops processing that is being executed when the result of the check shows that the (Continued)

communication paths have not been determined to be reliable.

8 Claims, 5 Drawing Sheets

(52) U.S. Cl.
CPC ...... *G06F 11/2094* (2013.01); *H04L 43/0805* (2013.01); *H04L 43/10* (2013.01); *G06F 2201/805* (2013.01); *G06F 2201/82* (2013.01)

(58) Field of Classification Search
USPC ........................................................ 714/4.11
See application file for complete search history.

(56) References Cited

U.S. PATENT DOCUMENTS

| | | | | |
|---|---|---|---|---|
| 7,739,677 | B1* | 6/2010 | Kekre | G06F 11/202 709/214 |
| 8,108,715 | B1* | 1/2012 | Agarwal | G06F 11/0709 714/10 |
| 8,498,967 | B1* | 7/2013 | Chatterjee | G06F 17/30174 707/639 |
| 9,658,912 | B2* | 5/2017 | Gao | G06F 11/0757 |
| 2002/0083036 | A1* | 6/2002 | Price | G06F 11/2028 |
| 2004/0078644 | A1* | 4/2004 | Fujibayashi | G06F 11/0727 714/6.31 |
| 2005/0005001 | A1* | 1/2005 | Hara | G06F 11/20 709/221 |
| 2005/0050398 | A1* | 3/2005 | Rao | G06F 11/0709 714/39 |
| 2009/0276657 | A1* | 11/2009 | Wetmore | G06F 11/1482 714/4.1 |
| 2010/0017409 | A1* | 1/2010 | Rawat | G06F 17/30171 707/E17.007 |
| 2010/0318610 | A1 | 12/2010 | Hisgen et al. | |
| 2012/0054546 | A1* | 3/2012 | Kampouris | G06F 11/0709 714/16 |
| 2012/0179771 | A1* | 7/2012 | Ganti | G06F 11/1425 709/213 |

FOREIGN PATENT DOCUMENTS

| | | |
|---|---|---|
| CN | 101582787 A | 11/2009 |
| CN | 101674331 A | 3/2010 |
| CN | 102394914 A | 3/2012 |
| CN | 102457400 A | 5/2012 |
| CN | 102932118 A | 2/2013 |
| CN | 103051470 A | 4/2013 |
| CN | 103209095 A | 7/2013 |
| EP | 2487592 A1 | 8/2012 |
| JP | H08-171507 A | 7/1996 |
| JP | 2003-173299 A | 6/2003 |
| JP | 2005-073277 A | 3/2005 |
| JP | 2008-172592 A | 7/2008 |
| JP | 2012-168623 A | 9/2012 |
| JP | 2012-173996 A | 9/2012 |
| JP | 2013-250918 A | 12/2013 |

OTHER PUBLICATIONS

International Search Report corresponding to PCT/JP2014/083085, dated Jan. 20, 2015, 2 pages.

Chinese Office Action issued by the State Intellectual Property Office of People's Republic of China for Chinese Application No. 201480070639.5 dated Jul. 14, 2017 (38 pages).

* cited by examiner

FIG.4

| SERVER APPARATUS10 | RELIABILITY | SIGNAL RECEPTION |
|---|---|---|
| COMMUNICATION PATH30: public LAN | YES | NO |
| COMMUNICATION PATH40: Interconnect LAN | YES | NO |
| COMMUNICATION PATH50: SCSI/FC | NO | NO |

⇒ SERVER APPARATUS 10: DETERMINE THAT SERVER APPARATUS 20 IS DOWN

| SERVER APPARATUS20 | RELIABILITY | SIGNAL RECEPTION |
|---|---|---|
| COMMUNICATION PATH30: public LAN | NO | NO |
| COMMUNICATION PATH40: Interconnect LAN | NO | NO |
| COMMUNICATION PATH50: SCSI/FC | NO | NO |

⇒ SERVER APPARATUS 20: DETERMINE THAT SERVER APPARATUS 20 SHOULD STOP OPERATION PROCESSING

CLUSTER SYSTEM, SERVER DEVICE, CLUSTER SYSTEM MANAGEMENT METHOD, AND COMPUTER-READABLE RECORDING MEDIUM

CROSS-REFERENCE TO RELATED APPLICATIONS

This application is a national stage application of International Application No. PCT/JP2014/083085 entitled "CLUSTER SYSTEM, SERVER DEVICE, CLUSTER SYSTEM MANAGEMENT METHOD, AND COMPUTER-READABLE RECORDING MEDIUM," filed on Dec. 15, 2014, which claims the benefit of the priority of Japanese Patent Application No. JP2013-267038 filed on Dec. 25, 2013, the disclosures of each of which are hereby incorporated by reference in their entirety.

TECHNICAL FIELD

The present invention relates to a cluster system including a plurality of server apparatuses, the server apparatuses used therein, a method of managing the cluster system, and a computer-readable recording medium storing a program for realizing them.

BACKGROUND ART

Companies and the like use a cluster system to allow operations to be continuously performed in the event of a system fault. In the cluster system, a plurality of server apparatuses are connected to one another, and these server apparatuses act as if they collectively represent a single server apparatus for a user.

Furthermore, in the cluster system, a fault is detected through heartbeat communication between the server apparatuses so as to prevent stoppage of operations (for example, see Patent Documents 1 and 2). In heartbeat communication, the server apparatuses transmit a signal indicating a self-presence (hereinafter referred to as a "heartbeat") to one another at a set interval.

Specifically, in the systems disclosed in Patent Documents 1 and 2, each server apparatus first determines whether a timeout has occurred in heartbeat communication with respect to each communication path. When a timeout has occurred, it is determined that some sort of fault has occurred. When it is determined that a fault has occurred, each server determines whether a reception packet arrived within a set timeout period through a network. If the reception packet did not arrive (timeout), it is determined that a communication fault has occurred. If the reception packet arrived, it is determined that an abnormality has occurred in a partner server.

In the systems disclosed in Patent Documents 1 and 2, upon detection of the occurrence of a fault, a fault-free server apparatus takes over operations of a server apparatus with the fault. This prevents stoppage of the operations.

LIST OF PRIOR ART DOCUMENTS

Patent Documents

Patent Document 1: JP 2003-173299A
Patent Document 2: JP 2008-172592A

DISCLOSURE OF THE INVENTION

Problems to be Solved by the Invention

However, in the systems disclosed in Patent Documents 1 and 2, the occurrence of a fault is detected on the basis of whether a heartbeat has been received, as well as the reception state of a packet received from the network. This gives rise to the possibility that a so-called split-brain syndrome will occur.

For example, assume that a communication interface (network card) of one server apparatus has failed in the systems disclosed in Patent Documents 1 and 2. In this case, one server apparatus mentioned above can receive neither a heartbeat nor a packet from the network, and hence determines that a communication fault has occurred. On the other hand, another server apparatus cannot receive a heartbeat but can receive a packet from the network, and hence determines that one server apparatus mentioned above is down due to the occurrence of a fault. If one server apparatus mentioned above is executing operation processing, the other server apparatus starts the operation processing as well. As a result, both server apparatuses execute the same operation processing.

In this case, if the operation processing is, for example, presentation of a static web site that merely provides information, no problem arises. However, if the operation processing is updating of a database, there will be a clash of contents of processing; this is the split-brain syndrome.

One example of the objects of the present invention is to provide a cluster system, a server apparatus, a method of managing the cluster system, and a computer-readable recording medium that can solve the above-described problems and prevent a clash of contents of processing in the cluster system.

Means for Solving the Problems

To achieve the above object, in one aspect of the present invention, a cluster system includes a plurality of server apparatuses that are connected by a communication path, and each of the plurality of server apparatuses includes: a signal transmission unit that transmits a signal indicating a self-presence to another server apparatus via the communication path; a reliability determination unit that determines whether the communication path is reliable; and a processing management unit that, in a state where the signal is not receivable from the other server apparatus, checks whether the communication path to the other server apparatus has been determined to be reliable, and stops processing that is being executed when a result of the check shows that the communication path has not been determined to be reliable.

To achieve the above object, in another aspect of the present invention, a server apparatus is connected to another server apparatus by a communication path, and includes: a signal transmission unit that transmits a signal indicating a self-presence to the other server apparatus via the communication path; a reliability determination unit that determines whether the communication path is reliable; and a processing management unit that, in a state where the signal is not receivable from the other server apparatus, checks whether the communication path to the other server apparatus has been determined to be reliable, and stops processing that is being executed when a result of the check shows that the communication path has not been determined to be reliable.

To achieve the above object, in still another aspect of the present invention, a method of managing a cluster system uses a plurality of server apparatuses that are connected by a communication path, and includes the following steps executed by each of the plurality of server apparatuses: (a) a step of transmitting a signal indicating a self-presence to another server apparatus via the communication path; (b) a step of determining whether the communication path is reliable; and (c) a step of, in a state where the signal is not receivable from the other server apparatus, checking whether the communication path to the other server apparatus has been determined to be reliable, and stopping processing that is being executed when a result of the check shows that the communication path has not been determined to be reliable.

To achieve the above object, in still another aspect of the present invention, a computer-readable recording medium stores a program including an instruction that causes a computer to execute the following steps, the computer being connected to another computer by a communication path: (a) a step of transmitting a signal indicating a self-presence to the other computer via the communication path; (b) a step of determining whether the communication path is reliable; and (c) a step of, in a state where the signal is not receivable from the other computer, checking whether the communication path to the other computer has been determined to be reliable, and stopping processing that is being executed when a result of the check shows that the communication path has not been determined to be reliable.

Advantageous Effects of the Invention

As described above, the present invention can prevent a clash of contents of processing in the cluster system.

BRIEF DESCRIPTION OF THE DRAWINGS

FIG. 4 shows the results of reliability determination made by the server apparatuses composing the cluster system according to the embodiment of the present invention.

MODE FOR CARRYING OUT THE INVENTION (Embodiment)

The following describes a cluster system, server apparatuses, a method of managing the server apparatuses, and a program according to an embodiment of the present invention with reference to FIGS. 1 to 5.

[System Configuration]

Figure 1:
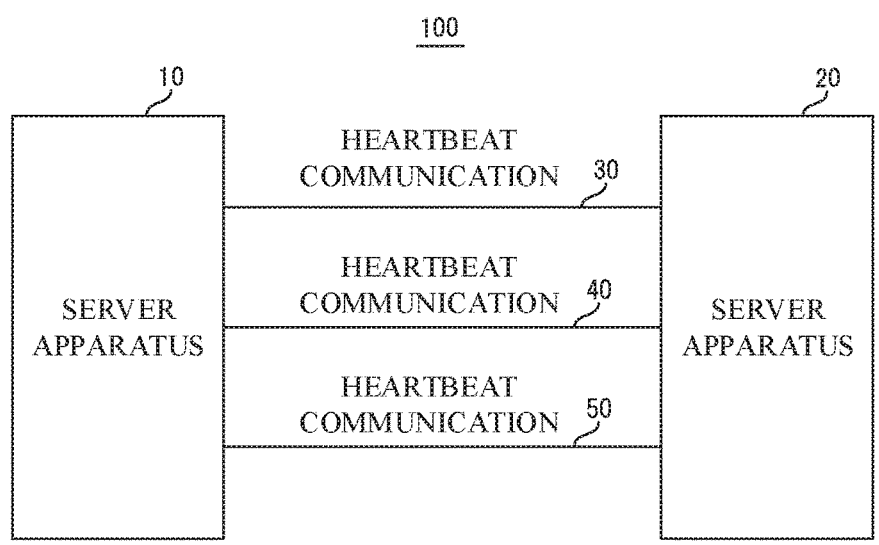
FIG. 1 is a schematic diagram showing a configuration of a cluster system according to an embodiment of the present invention.

First, a description is given of the configurations of the cluster system and the server apparatuses according to the embodiment of the present invention using FIG. 1. FIG. 1 is a schematic diagram showing the configuration of the cluster system according to the embodiment of the present invention.

As shown in FIG. 1, a cluster system 100 according to the present embodiment includes server apparatuses 10 and 20 that are connected by communication paths 30 to 50. In the cluster system 100, on the occurrence of a fault in one of the server apparatuses, the other server apparatus takes over processing that is being executed by the server apparatus with the fault. This prevents stoppage of operations.

Each of the server apparatuses 10 and 20 transmits a signal indicating a self-presence, that is to say, a heartbeat to the other server apparatus via the communication paths 30 to 50, and is also capable of determining whether the communication paths 30 to 50 are reliable.

When each of the server apparatuses 10 and 20 is in a state where a heartbeat is not receivable from the other server apparatus, it checks whether the communication paths 30 to 50 to the other server apparatus have been determined to be reliable. If the result of the check shows that the communication paths 30 to 50 have not been determined to be reliable, each server apparatus can stop processing that is being executed.

Therefore, in the present embodiment, the server apparatuses 10 and 20 make a determination about reliability with respect to the communication paths 30 to 50 for heartbeat communication, and can stop processing depending on the result of the determination even if no apparatus is actually down. This prevents a clash of contents of processing, that is to say, the occurrence of a so-called split-brain syndrome.

Figure 2:
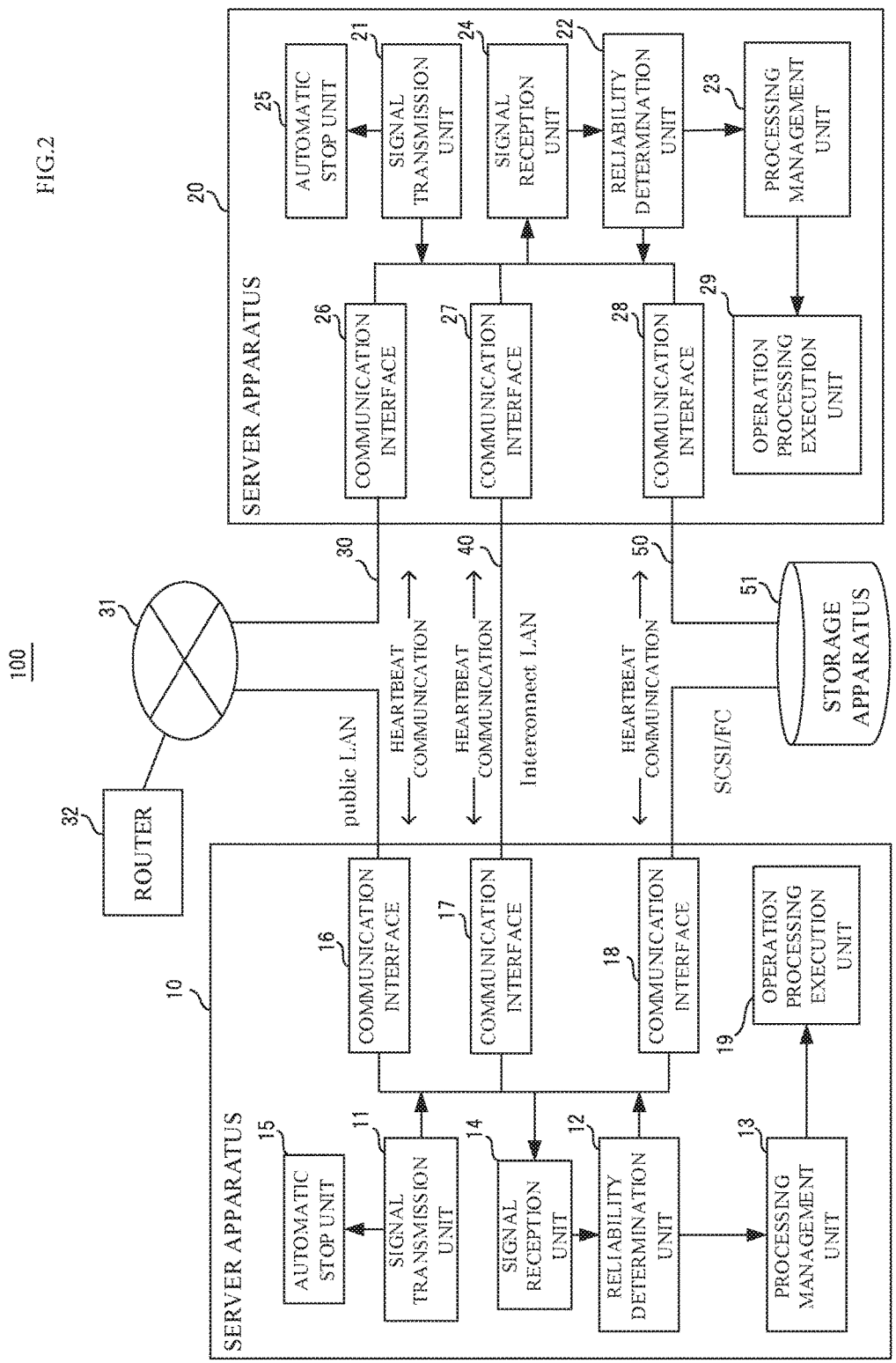
FIG. 2 is a block diagram showing the configurations of the cluster system and server apparatuses according to the embodiment of the present invention.

The following is a more specific description of the configurations of the cluster system and the server apparatuses according to the present embodiment using FIG. 2. FIG. 2 is a block diagram showing the configurations of the cluster system and the server apparatuses according to the embodiment of the present invention.

As shown in FIG. 2, in the present embodiment, the communication path 30 is a public local area network (LAN) serving as a communication path running through a network 31. The communication path 40 is an interconnect LAN serving as a communication path that directly connects between the server apparatuses. The communication path 50 runs through a storage apparatus 51.

The server apparatuses 10 and 20 and the storage apparatus 51 are connected by the communication path 50 using the Small Computer System Interface (SCSI) or Fiber Channel (FC). The communication path 50 may be constructed by utilizing a network, such as the Internet, instead of a dedicated cable.

In the present embodiment, as shown in FIG. 2, the server apparatus 10 includes a signal transmission unit 11, a reliability determination unit 12, a processing management unit 13, a signal reception unit 14, an automatic stop unit 15, communication interfaces 16 to 18 corresponding to the communication paths, and an operation processing execution unit 19. Among these, the communication interfaces 16 to 18 are constituted by, for example, network interface cards (NICs).

The signal transmission unit 11 transmits a heartbeat to the other server apparatus via the communication paths 30 to 50. The signal transmission unit 11 also transmits a heartbeat to the automatic stop unit 15, in addition to the communication paths 30 to 50, at the same timing as transmission via the communication paths. Note that a heartbeat may be transmitted periodically, or may be transmitted in accordance with a set condition(s).

The signal reception unit 14 receives a heartbeat from the other server apparatus via the communication interfaces 16 to 18. The signal reception unit 14 also determines whether it is in a state where a heartbeat is not receivable from the other server apparatus, specifically, whether a heartbeat has timed out.

The reliability determination unit 12 determines whether the communication paths 30 to 50 are reliable. Specifically, with regard to the communication path 30, the reliability determination unit 12 transmits a request (ICMP echo request) to a device (router) 32 that is present in the network 31, and determines that the communication path 40 is reliable when a response (ICMP echo reply) to the request has been returned from the device 32.

The reliability determination unit 12 determines that the communication path 40 is reliable when electric power is applied to the NIC functioning as the communication interface 17. With regard to the communication path 50, the reliability determination unit 12 transmits a command prescribed by the SCSI or FC to the storage apparatus 51, and determines that the communication path 50 is reliable when a response to the command has been returned from the storage apparatus 51.

The operation processing execution unit 19 executes processing for an operation performed by the cluster system 100 (operation processing). Specifically, the operation processing execution unit 19 is constructed by an application program for the operation processing. The operation processing execution unit 19 is constructed on an operation-by-operation basis.

When the signal reception unit 14 determines that it is in a state where a heartbeat is not receivable from the other server apparatus, the processing management unit 13 checks whether the reliability determination unit 12 has determined that the communication paths 30 to 50 are reliable.

If the result of the check shows that the communication paths 30 to 50 have not been determined to be reliable, the processing management unit 13 causes the operation processing execution unit 19 to stop processing that is being executed. On the other hand, if the result of the check shows that one or more of the communication paths have been determined to be reliable, the processing management unit 13 determines that an abnormality has occurred in the other server apparatus. In this case, if the operation processing execution unit 19 is already executing operation processing, the processing management unit 13 causes the operation processing execution unit 19 to continuously execute that processing. On the other hand, if the operation processing execution unit 19 is not executing operation processing, the processing management unit 13 causes the operation processing execution unit 19 to execute operation processing being executed by the other server apparatus in place of the other server apparatus.

The automatic stop unit 15 stops the server apparatus 10 when transmission of a heartbeat from the signal transmission unit 11 has ceased. Specifically, the automatic stop unit 15 is realized by a watchdog timer that is built in the server apparatus 10 in advance. As such an automatic stop unit 15 is provided, the server apparatus 10 is stopped also when, for example, the server apparatus 10 is simply hung. This action is taken for the following reason. Following the hang of the server apparatus 10, the server apparatus 20 determines that a fault has occurred in the server apparatus 10, and takes over processing of the server apparatus 10; thereafter, if the server apparatus 10 recovers from the hung state, the split-brain syndrome will occur.

The server apparatus 20 includes a signal transmission unit 21, a reliability determination unit 22, a processing management unit 23, a signal reception unit 24, an automatic stop unit 25, communication interfaces 16 to 18 corresponding to the communication paths, and an operation processing execution unit 29. As the server apparatuses 10 and 20 are configured in the same manner and have the same functions, a description of the components of the server apparatus 20 is omitted. Although only two server apparatuses compose the cluster system 100 in the examples of FIGS. 1 and 2, no particular restriction is intended regarding the number of the server apparatuses in the present embodiment.

[Behavior of System]

Figure 3:
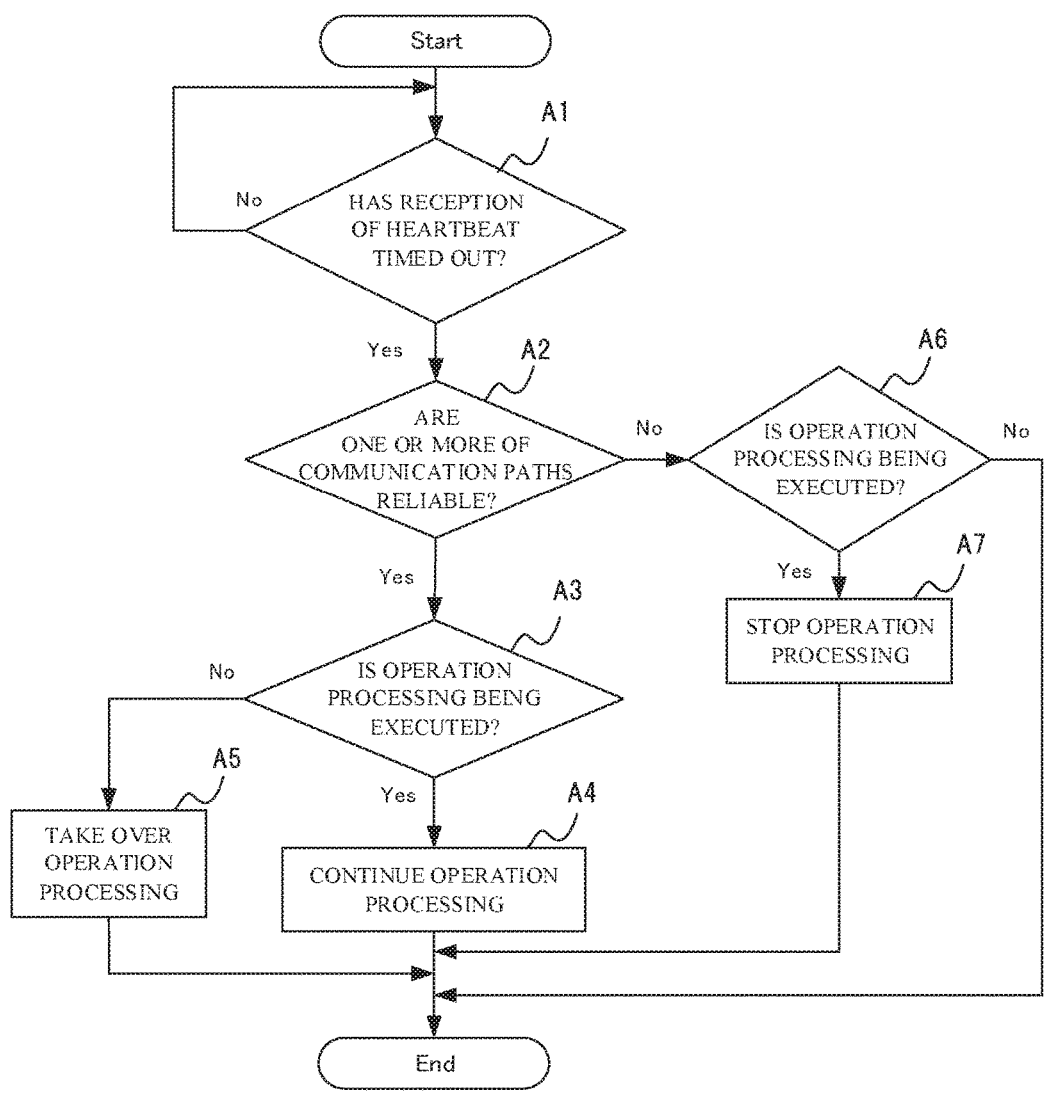
FIG. 3 is a flow diagram showing the behavior of the server apparatuses composing the cluster system according to the embodiment of the present invention.

A description is now given of the behavior of the cluster system 100 according to the embodiment of the present invention using FIG. 3. FIG. 3 is a flow diagram showing the behavior of the server apparatuses composing the cluster system according to the embodiment of the present invention.

The following description is provided with a focus on the server apparatus 10 with reference to FIG. 2 as needed. In the present embodiment, the method of managing the cluster system is implemented by causing the cluster system 100 to operate. Therefore, the following description of the behavior of the cluster system applies to the method of managing the cluster system according to the present embodiment.

It is on the premise that, in the server apparatus 10, the signal transmission unit 11 transmits a heartbeat to the server apparatus 20 via the communication interfaces 16 to 18 at a set interval. Furthermore, in the server apparatus 10, the reliability determination unit 12 determines whether the communication paths 30 to 50 are reliable in synchronization with the timing of transmission or reception of a heartbeat.

Similarly, in the server apparatus 20 as well, the signal transmission unit 21 transmits a heartbeat to the server apparatus 10 via the communication interfaces 26 to 28 at a set interval. Furthermore, in the server apparatus 20 as well, the reliability determination unit 22 determines whether the communication paths 30 to 50 are reliable in synchronization with the timing of transmission or reception of a heartbeat.

As shown in FIG. 3, in the server apparatus 10, the signal reception unit 14 determines whether the reception of a heartbeat from the server apparatus 20 has timed out (step A1).

If the result of the determination in step A1 shows that the reception of the heartbeat has not timed out, the signal reception unit 14 executes step A1 again after a set period has elapsed. On the other hand, if the result of the determination in step A1 shows that the reception of the heartbeat has timed out, the signal reception unit 14 notifies the processing management unit 13 of the timeout.

Upon being notified of the timeout, the processing management unit 13 determines whether one or more of the communication paths 30 to 50 are reliable (step A2). If the result of the determination in step A2 shows that one or more of the communication paths are reliable, the processing management unit 13 determines whether the operation processing execution unit 19 is executing operation processing (step A3).

If the result of the determination in step A3 shows that the operation processing execution unit 19 is executing operation processing, the processing management unit 13 causes the operation processing execution unit 19 to continue the operation processing (step A4). Conversely, if the result of the determination in step A3 shows that the operation processing execution unit 19 is not executing operation processing, the processing management unit 13 causes the operation processing execution unit 19 to take over processing that is being executed by the server apparatus 20 (step A5).

If the result of the determination in step A2 shows that none of the communication paths is reliable, the processing management unit 13 similarly determines whether the operation processing execution unit 19 is executing operation processing (step A6).

If the result of the determination in step A6 shows that the operation processing execution unit 19 is not executing operation processing, processing of the server apparatus 10 is ended. On the other hand, if the result of the determination in step A6 shows that the operation processing execution unit 19 is executing operation processing, the processing management unit 13 causes the operation processing execution unit 19 to stop the operation processing (step A7).

The above-described steps A1 to A7 are repeatedly executed by the server apparatus 10. Steps similar to steps A1 to A7 are repeatedly executed by the server apparatus 20 as well.

[Specific Example]

A specific example will now be described using FIG. 4. FIG. 4 shows the results of reliability determination made by the server apparatuses composing the cluster system according to the embodiment of the present invention.

For example, assume that the server apparatuses 10 and 20 shown in FIG. 2 cannot receive a heartbeat via any of the communication paths. In this case, in the server apparatus 10, the reliability determination unit 12 determines whether the communication paths 30 to 50 are currently reliable.

If the result of the determination shows that the communication paths 30 and 40 are determined to be reliable in the server apparatus 10 as shown in FIG. 4, the server apparatus 10 determines that a fault has occurred in the server apparatus 20. This is because, when the server apparatus 20 cannot transmit a heartbeat even though the server apparatus 10 has determined that one or more of the communication paths are reliable, the server apparatus 20 is deemed a source of a problem.

Now, assume that a fault has not actually occurred in the server apparatus 20, and a heartbeat cannot be transmitted/received due to a problem in the communication paths 30 to 50 near the server apparatus 20. In this case, as shown in FIG. 4, the server apparatus 20 determines that none of the communication paths 30 to 50 is reliable; thus, if the server apparatus 20 is executing operation processing, it stops the operation processing even though a fault has not occurred therein. As a result, the occurrence of a split-brain syndrome is prevented.

On the other hand, when a heartbeat cannot be transmitted due to a fault that has occurred in the server apparatus 20, the server apparatus 20 does not execute the processes of the above-described steps A1 to A7, but operation processing is already stopped therein. Therefore, a split-brain syndrome does not occur.

The server apparatus 10 determines that a fault has occurred in the server apparatus 20 also when the server apparatus 20 cannot transmit a heartbeat to the server apparatus 10 simply due to a hang of the server apparatus 20. Such a simple hang will allow the server apparatus 20 to recover from the hung state after a while. This gives rise to the possibility that a split-brain syndrome will occur. For this reason, in the present embodiment, the server apparatuses 10 and 20 are provided with the automatic stop unit 15 and 25 as described earlier. This prevents the occurrence of a split-brain syndrome.

[Program]

It is sufficient for the program according to the present embodiment to cause a computer to execute steps A1 to A7 shown in FIG. 3. The cluster system, the server apparatuses, and the method of managing the cluster system according to the present embodiment can be realized by installing this program in the computer and executing the installed program. In this case, a central processing unit (CPU) of the computer serving as the server apparatus 10 functions as the signal transmission unit 11, the reliability determination unit 12, the processing management unit 13, the signal reception unit 14, and the automatic stop unit 15, and executes processing. A central processing unit (CPU) of the computer serving as the server apparatus 20 functions as the signal transmission unit 21, the reliability determination unit 22, the processing management unit 23, the signal reception unit 24, and the automatic stop unit 25, and executes processing.

[Modification Example]

In the above-described example, in each server apparatus, the reliability determination unit makes a determination about reliability with respect to all communication paths. However, the present embodiment is not limited to this mode. The present embodiment may be directed to a mode in which the reliability determination units make a determination about reliability only with respect to a part of the communication paths.

Furthermore, in the above-described example, the communication paths are based on the public LAN, interconnect LAN, and SCSI/FC. However, in the present embodiment, no particular restriction is intended regarding the number and types of the communication paths connecting between the server apparatuses. Examples of other communication paths include a LAN for controlling a baseboard management controller (BMC), a communication path utilizing an RS-232-C port, a communication path utilizing a wireless LAN, and a communication path utilizing a USB terminal.

[Physical Configuration]

Figure 5:
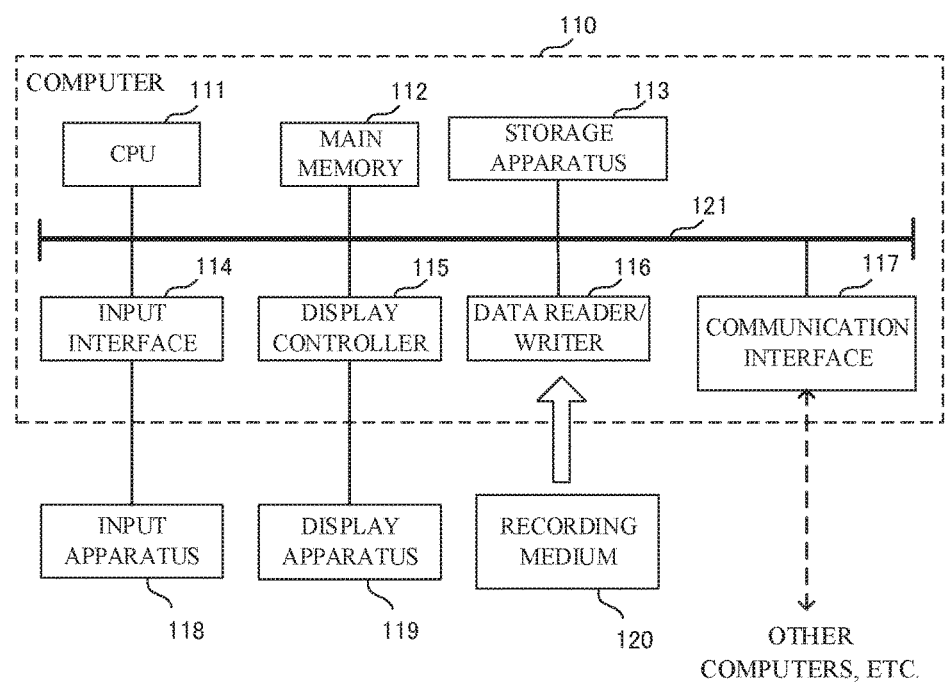
FIG. 5 is a block diagram showing an example of a computer that realizes the server apparatuses according to the embodiment of the present invention.

A description is now given of a computer that realizes the server apparatuses by executing programs according to the present embodiment using FIG. 5. FIG. 5 is a block diagram showing an example of the computer that realizes the server apparatuses according to the embodiment of the present invention.

As shown in FIG. 5, a computer 110 includes a CPU 111, a main memory 112, a storage apparatus 113, an input interface 114, a display controller 115, a data reader/writer 116, and a communication interface 117. These components are connected in such a manner that they can perform data communication with one another via a bus 121.

The CPU 111 executes various types of calculation by deploying the programs (code) according to the present embodiment stored in the storage apparatus 113 to the main memory 112, and executing the deployed programs in a predetermined order. The main memory 112 is typically a volatile storage apparatus, such as a dynamic random-access memory (DRAM). The programs according to the present embodiment are provided while being stored in a computer-readable recording medium 120. Note that the programs according to the present embodiment may be distributed over the Internet connected via the communication interface 117.

Specific examples of the storage apparatus 113 include a hard disk and a semiconductor storage apparatus, such as a flash memory. The input interface 114 mediates data transmission between the CPU 111 and an input apparatus 118, such as a keyboard and a mouse. The display controller 115 is connected to a display apparatus 119 and controls display on the display apparatus 119.

The data reader/writer 116 mediates data transmission between the CPU 111 and the recording medium 120. The data reader/writer 116 reads the programs from the recording medium 120, and writes the result of processing of the computer 110 to the recording medium 120. The communication interface 117 mediates data transmission between the CPU 111 and other computers.

Specific examples of the recording medium 120 include: a general-purpose semiconductor storage apparatus, such as CompactFlash (CF, registered trademark) and Secure Digital (SD); a magnetic storage medium, such as a flexible disk; and an optical storage medium, such as a compact disc read-only memory (CD-ROM).

A part or all of the above-described embodiment can be described as, but are not limited to, the following supplementary notes 1 to 24.

(Supplementary Note 1)

A cluster system including a plurality of server apparatuses that are connected by a communication path, each of the plurality of server apparatuses including: a signal transmission unit that transmits a signal indicating a self-presence to another server apparatus via the communication path; a reliability determination unit that determines whether the communication path is reliable; and a processing management unit that, in a state where the signal is not receivable from the other server apparatus, checks whether the communication path to the other server apparatus has been determined to be reliable, and stops processing that is being executed when a result of the check shows that the communication path has not been determined to be reliable.

(Supplementary Note 2)

The cluster system according to supplementary note 1, wherein when the result of the check shows that the communication path has been determined to be reliable, the processing management unit determines that an abnormality has occurred in the other server apparatus, and causes the server apparatus thereof to continuously execute the processing that is being executed or to execute processing that is being executed by the other server apparatus in place of the other server apparatus.

(Supplementary Note 3)

The cluster system according to supplementary note 2, wherein the plurality of server apparatuses are connected to one another by two or more communication paths, and the processing management unit of each server apparatus determines that the abnormality has occurred in the other server apparatus when one or more of the communication paths have been determined to be reliable.

(Supplementary Note 4)

The cluster system according to supplementary note 3, wherein the plurality of server apparatuses are connected to one another by a communication path directly connecting between the server apparatuses, a communication path running through a network, and a communication path running through a storage apparatus.

(Supplementary Note 5)

The cluster system according to supplementary note 4, wherein the reliability determination unit: determines that the communication path directly connecting between the server apparatuses is reliable when electric power is applied to a communication interface; transmits a request to a device that is present in the network with regard to the communication path running through the network, and determines that the communication path running through the network is reliable when a response to the request has been returned from the device; and transmits a command to the storage apparatus with regard to the communication path running through the storage apparatus, and determines that the communication path running through the storage apparatus is reliable when a response to the command has been returned from the storage apparatus.

(Supplementary Note 6)

The cluster system according to supplementary note 1, wherein each of the plurality of server apparatuses further includes an automatic stop unit that stops the server apparatus thereof when transmission of the signal from the signal transmission unit has ceased.

(Supplementary Note 7)

A server apparatus connected to another server apparatus by a communication path, the server apparatus including: a signal transmission unit that transmits a signal indicating a self-presence to the other server apparatus via the communication path; a reliability determination unit that determines whether the communication path is reliable; and a processing management unit that, in a state where the signal is not receivable from the other server apparatus, checks whether the communication path to the other server apparatus has been determined to be reliable, and stops processing that is being executed when a result of the check shows that the communication path has not been determined to be reliable.

(Supplementary Note 8)

The server apparatus according to supplementary note 7, wherein when the result of the check shows that the communication path has been determined to be reliable, the processing management unit determines that an abnormality has occurred in the other server apparatus, and causes the server apparatus to continuously execute the processing that is being executed or to execute processing that is being executed by the other server apparatus in place of the other server apparatus.

(Supplementary Note 9)

The server apparatus according to supplementary note 8, wherein the server apparatus is connected to the other server apparatus by two or more communication paths, and the processing management unit determines that the abnormality has occurred in the other server apparatus when one or more of the communication paths have been determined to be reliable.

(Supplementary Note 10)

The server apparatus according to supplementary note 9, wherein the server apparatus is connected to the other server apparatus by a communication path directly connecting between the server apparatuses, a communication path running through a network, and a communication path running through a storage apparatus.

(Supplementary Note 11)

The server apparatus according to supplementary note 10, wherein the reliability determination unit: determines that the communication path directly connecting between the server apparatuses is reliable when electric power is applied to a communication interface; transmits a request to a device that is present in the network with regard to the communication path running through the network, and determines that the communication path running through the network is reliable when a response to the request has been returned from the device; and transmits a command to the storage apparatus with regard to the communication path running through the storage apparatus, and determines that the communication path running through the storage apparatus is reliable when a response to the command has been returned from the storage apparatus.

(Supplementary Note 12)

The server apparatus according to supplementary note 7, further including an automatic stop unit that stops the server apparatus when transmission of the signal from the signal transmission unit has ceased.

(Supplementary Note 13)

A method of managing a cluster system using a plurality of server apparatuses that are connected by a communication path, the method including the following steps executed by each of the plurality of server apparatuses: (a) a step of transmitting a signal indicating a self-presence to another server apparatus via the communication path; (b) a step of determining whether the communication path is reliable; and (c) a step of, in a state where the signal is not receivable from the other server apparatus, checking whether the communication path to the other server apparatus has been determined to be reliable, and stopping processing that is being executed when a result of the check shows that the communication path has not been determined to be reliable.

(Supplementary Note 14)

The method of managing the cluster system according to supplementary note 13, wherein in step (c), when the result of the check shows that the communication path has been determined to be reliable, it is determined that an abnormality has occurred in the other server apparatus, and the server apparatus continuously executes the processing that is being executed or executes processing that is being executed by the other server apparatus in place of the other server apparatus.

(Supplementary Note 15)

The method of managing the cluster system according to supplementary note 14, wherein the plurality of server apparatuses are connected to one another by two or more communication paths, and in step (c), it is determined that the abnormality has occurred in the other server apparatus when one or more of the communication paths have been determined to be reliable.

(Supplementary Note 16)

The method of managing the cluster system according to supplementary note 15, wherein the plurality of server apparatuses are connected to one another by a communication path directly connecting between the server apparatuses, a communication path running through a network, and a communication path running through a storage apparatus.

(Supplementary Note 17)

The method of managing the cluster system according to supplementary note 16, wherein in step (b), the communication path directly connecting between the server apparatuses is determined to be reliable when electric power is applied to a communication interface, a request is transmitted to a device that is present in the network with regard to the communication path running through the network, and the communication path running through the network is determined to be reliable when a response to the request has been returned from the device, and a command is transmitted to the storage apparatus with regard to the communication path running through the storage apparatus, and the communication path running through the storage apparatus is determined to be reliable when a response to the command has been returned from the storage apparatus.

(Supplementary Note 18)

The method of managing the cluster system according to supplementary note 13, further including the following step executed by each of the plurality of server apparatuses: (d) a step of stopping the server apparatus when transmission of the signal in step (a) has ceased.

(Supplementary Note 19)

A computer-readable recording medium storing a program including an instruction that causes a computer to execute the following steps, the computer being connected to another computer by a communication path: (a) a step of transmitting a signal indicating a self-presence to the other computer via the communication path; (b) a step of determining whether the communication path is reliable; and (c) a step of, in a state where the signal is not receivable from the other computer, checking whether the communication path to the other computer has been determined to be reliable, and stopping processing that is being executed when a result of the check shows that the communication path has not been determined to be reliable.

(Supplementary Note 20)

The computer-readable recording medium according to supplementary note 19, wherein in step (c), when the result of the check shows that the communication path has been determined to be reliable, it is determined that an abnormality has occurred in the other computer, and the computer continuously executes the processing that is being executed or executes processing that is being executed by the other computer in place of the other computer.

(Supplementary Note 21)

The computer-readable recording medium according to supplementary note 20, wherein the computer is connected to the other computer by two or more communication paths, and in step (c), it is determined that the abnormality has occurred in the other computer when one or more of the communication paths have been determined to be reliable.

(Supplementary Note 22)

The computer-readable recording medium according to supplementary note 21, wherein the computer is connected to the other computer by a communication path directly connecting between the computers, a communication path running through a network, and a communication path running through a storage apparatus.

(Supplementary Note 23)

The computer-readable recording medium according to supplementary note 22, wherein in step (b), the communication path directly connecting between the computers is determined to be reliable when electric power is applied to a communication interface, a request is transmitted to a device that is present in the network with regard to the communication path running through the network, and the communication path running through the network is determined to be reliable when a response to the request has been returned from the device, and a command is transmitted to the storage apparatus with regard to the communication path running through the storage apparatus, and the communication path running through the storage apparatus is determined to be reliable when a response to the command has been returned from the storage apparatus.

(Supplementary Note 24)

The computer-readable recording medium according to supplementary note 19, wherein the program further includes an instruction that causes the computer to execute (d) a step of stopping the computer when transmission of the signal in step (a) has ceased.

Although the invention of the present application has been described above on the basis of the embodiment, the invention of the present application is not limited to the above-described embodiment. The configurations and details of the invention of the present application may be subject to various changes that can be understood by a person skilled in the art within the scope of the invention of the present application.

The present application claims the benefit of priority from Japanese Patent Application No. 2013-267038, filed Dec. 25, 2013, the disclosure of which is incorporated herein by reference in its entirety.

INDUSTRIAL APPLICABILITY

As described above, the present invention can prevent a clash of contents of processing in the cluster system. The present invention is useful in management of the cluster system.

REFERENCE SIGNS LIST 10 server apparatus
11 signal transmission unit
12 reliability determination unit
13 processing management unit
14 signal reception unit
15 automatic stop unit
16, 17, 18 communication interface
19 operation processing execution unit
20 server apparatus
21 signal transmission unit
22 reliability determination unit
23 processing management unit
24 signal reception unit
25 automatic stop unit
26, 27, 28 communication interface
29 operation processing execution unit
30 communication path
31 network
32 router
40 communication path
50 communication path
51 storage apparatus
100 cluster system
110 computer
111 CPU
112 main memory
113 storage apparatus
114 input interface
115 display controller
116 data reader/writer
117 communication interface
118 input apparatus
119 display apparatus
120 recording medium
121 bus

The invention claimed is:

1. A cluster system comprising a plurality of server apparatuses realized by a computer that are connected by a communication path, each of the plurality of server apparatuses comprising:
a processor functioning as a signal transmission unit, a reliability determination unit, and a processing management unit, wherein:
the signal transmission unit is configured to transmit a signal indicating a self-presence to another server apparatus via the communication path;
the reliability determination unit is configured to determine whether the communication path is reliable; and
the processing management unit, in a state where the signal is not receivable from the other server apparatus, is configured to check whether the communication path to the other server apparatus has been determined to be reliable, and stop processing that is being executed when a result of the check shows that the communication path has not been determined to be reliable,
wherein when the result of the check shows that the communication path has been determined to be reliable, the processing management unit determines that an abnormality has occurred in the other server apparatus, and causes the server apparatus thereof to continuously execute the processing that is being executed or to execute processing that is being executed by the other server apparatus in place of the other server apparatus,
wherein the plurality of server apparatuses are connected to one another by two or more communication paths, and
the processing management unit of each server apparatus determines that the abnormality has occurred in the other server apparatus when one or more of the communication paths have been determined to be reliable,
wherein the plurality of server apparatuses are connected to one another by a communication path directly connecting between the server apparatuses, a communication path running through a network, and a communication path running through a storage apparatus,
wherein the reliability determination unit:
determines that the communication path directly connecting between the server apparatuses is reliable when electric power is applied to a communication interface;
transmits a request to a device that is present in the network with regard to the communication path running through the network, and determines that the communication path running through the network is reliable when a response to the request has been returned from the device; and
transmits a command to the storage apparatus with regard to the communication path running through the storage apparatus, and determines that the communication path running through the storage apparatus is reliable when a response to the command has been returned from the storage apparatus.

2. The cluster system according to claim 1,
wherein each of the plurality of server apparatuses further comprises an automatic stop unit that stops the server apparatus thereof when transmission of the signal from the signal transmission unit has ceased.

3. A server apparatus connected to another server apparatus by a communication path, the server apparatus comprising a processor functioning as a signal transmission unit, a reliability determination unit, and a processing management unit, wherein:
the signal transmission unit is configured to transmit a signal indicating a self-presence to the other server apparatus via the communication path;
the reliability determination unit is configured to determine whether the communication path is reliable; and
the processing management unit, in a state where the signal is not receivable from the other server apparatus, is configured to check whether the communication path to the other server apparatus has been determined to be reliable, and stop processing that is being executed when a result of the check shows that the communication path has not been determined to be reliable,
wherein when the result of the check shows that the communication path has been determined to be reliable, the processing management unit determines that an abnormality has occurred in the other server apparatus, and causes the server apparatus to continuously execute the processing that is being executed or to execute processing that is being executed by the other server apparatus in place of the other server apparatus,
wherein the server apparatus is connected to the other server apparatus by two or more communication paths, and the processing management unit determines that the abnormality has occurred in the other server apparatus when one or more of the communication paths have been determined to be reliable, wherein the server apparatus is connected to the other server apparatus by a communication path directly connecting between the server apparatuses, a communication path running through a network, and a communication path running through a storage apparatus, wherein the reliability determination unit:

determines that the communication path directly connecting between the server apparatuses is reliable when electric power is applied to a communication interface;

transmits a request to a device that is present in the network with regard to the communication path running through the network, and determines that the communication path running through the network is reliable when a response to the request has been returned from the device; and transmits a command to the storage apparatus with regard to the communication path running through the storage apparatus, and determines that the communication path running through the storage apparatus is reliable when a response to the command has been returned from the storage apparatus.

4. The server apparatus according to claim 3, further comprising an automatic stop unit that stops the server apparatus when transmission of the signal from the signal transmission unit has ceased.

5. A method of managing a cluster system using a plurality of server apparatuses that are connected by a communication path, the method comprising steps stored in a memory and executed by a processor of each of the plurality of server apparatuses, the method comprising:

(a) a step of transmitting a signal indicating a self-presence to another server apparatus via the communication path;

(b) a step of determining whether the communication path is reliable; and (c) a step of, in a state where the signal is not receivable from the other server apparatus, checking whether the communication path to the other server apparatus has been determined to be reliable, and stopping processing that is being executed when a result of the check shows that the communication path has not been determined to be reliable, wherein in step (c), when the result of the check shows that the communication path has been determined to be reliable, it is determined that an abnormality has occurred in the other server apparatus, and the server apparatus continuously executes the processing that is being executed or executes processing that is being executed by the other server apparatus in place of the other server apparatus, wherein the plurality of server apparatuses are connected to one another by two or more communication paths, and in step (c), it is determined that the abnormality has occurred in the other server apparatus when one or more of the communication paths have been determined to be reliable, wherein the plurality of server apparatuses are connected to one another by a communication path directly connecting between the server apparatuses, a communication path running through a network, and a communication path running through a storage apparatus, wherein in step (b), the communication path directly connecting between the server apparatuses is determined to be reliable when electric power is applied to a communication interface, with regard to the communication path running through the network, a request is transmitted to a device that is present in the network, and the communication path running through the network is determined to be reliable when a response to the request has been returned from the device, and with regard to the communication path running through the storage apparatus, a command is transmitted to the storage apparatus, and the communication path running through the storage apparatus is determined to be reliable when a response to the command has been returned from the storage apparatus.

6. The method of managing the cluster system according to claim 5, further comprising the following step executed by each of the plurality of server apparatuses: (d) a step of stopping the server apparatus when transmission of the signal in step (a) has ceased.

7. A non-transitory computer-readable recording medium storing a program comprising an instruction that causes a computer to execute the following steps, the computer being connected to another computer by a communication path:

(a) a step of transmitting a signal indicating a self-presence to the other computer via the communication path;

(b) a step of determining whether the communication path is reliable; and (c) a step of, in a state where the signal is not receivable from the other computer, checking whether the communication path to the other computer has been determined to be reliable, and stopping processing that is being executed when a result of the check shows that the communication path has not been determined to be reliable, wherein in step (c), when the result of the check shows that the communication path has been determined to be reliable, it is determined that an abnormality has occurred in the other computer, and the computer continuously executes the processing that is being executed or executes processing that is being executed by the other computer in place of the other computer, wherein the computer is connected to the other computer by two or more communication paths, and in step (c), it is determined that the abnormality has occurred in the other computer when one or more of the communication paths have been determined to be reliable, wherein the computer is connected to the other computer by a communication path directly connecting between the computers, a communication path running through a network, and a communication path running through a storage apparatus, wherein in step (b), the communication path directly connecting between the computers is determined to be reliable when electric power is applied to a communication interface, with regard to the communication path running through the network, a request is transmitted to a device that is present in the network, and the communication path running through the network is determined to be reliable when a response to the request has been returned from the device, and with regard to the communication path running through the storage apparatus, a command is transmitted to the storage apparatus, and the communication path running through the storage apparatus is determined to be reliable when a response to the command has been returned from the storage apparatus.

8. The non-transitory computer-readable recording medium according to claim 7,
wherein the program further includes an instruction that causes the computer to execute (d) a step of stopping the computer when transmission of the signal in step (a) has ceased.

* * * * *